US006882994B2

(12) United States Patent  
Yoshimura et al.

(10) Patent No.: US 6,882,994 B2  
(45) Date of Patent: Apr. 19, 2005

(54) METHOD AND SYSTEM FOR QUERYING DATABASE, AS WELL AS A RECORDING MEDIUM FOR STORING A DATABASE QUERYING PROGRAM

(75) Inventors: Mitsuhiko Yoshimura, Yokohama (JP); Yuichi Yagawa, Yokohama (JP); Shigetoshi Hayashi, Fujisawa (JP); Norifumi Nishikawa, Machida (JP); Keiichiro Inaba, Musashino (JP)

(73) Assignee: Hitachi, Ltd., Tokyo (JP)

( * ) Notice: Subject to any disclaimer, the term of this patent is extended or adjusted under 35 U.S.C. 154(b) by 374 days.

(21) Appl. No.: 09/818,039

(22) Filed: Mar. 26, 2001

(65) Prior Publication Data

US 2001/0051939 A1 Dec. 13, 2001

(30) Foreign Application Priority Data

Jun. 12, 2000 (JP) ...................................... 2000-180702

(51) Int. Cl.[7] .............................................. G06F 17/30
(52) U.S. Cl. ..................... 707/3; 707/2; 707/6; 707/10; 707/100; 707/102; 707/202; 707/204
(58) Field of Search .......................... 707/2, 3, 10, 100, 707/201, 202, 204, 101, 104, 103, 102, 6

(56) References Cited

U.S. PATENT DOCUMENTS

| | | | | |
|---|---|---|---|---|
| 5,551,020 A | * | 8/1996 | Flax et al. ................... 707/101 |
| 5,561,795 A | * | 10/1996 | Sarkar ......................... 707/100 |
| 5,740,423 A | * | 4/1998 | Logan et al. .................. 707/10 |
| 5,991,772 A | * | 11/1999 | Doherty et al. ............. 707/202 |
| 6,014,673 A | * | 1/2000 | Davis et al. ................ 707/202 |
| 6,026,406 A | * | 2/2000 | Huang et al. ............... 707/100 |
| 6,092,083 A | * | 7/2000 | Brodersen et al. .......... 707/201 |
| 6,182,086 B1 | * | 1/2001 | Lomet et al. ............... 707/202 |
| 6,192,373 B1 | * | 2/2001 | Haegele .................... 707/104.1 |
| 6,233,578 B1 | * | 5/2001 | Machihara et al. ........... 707/10 |
| 6,266,669 B1 | * | 7/2001 | Brodersen et al. ............ 707/10 |
| 6,292,808 B1 | * | 9/2001 | Obermarck et al. ........ 707/202 |
| 6,389,430 B1 | * | 5/2002 | Parker ........................ 707/202 |
| 6,405,220 B1 | * | 6/2002 | Brodersen et al. .......... 707/202 |
| 6,553,392 B1 | * | 4/2003 | Mosher, Jr. et al. ........ 707/204 |
| 6,618,822 B1 | | 9/2003 | Loaiza et al. ................ 714/20 |
| 6,732,124 B1 | * | 5/2004 | Koseki et al. .............. 707/202 |

FOREIGN PATENT DOCUMENTS

| JP | 06-145929 | 1/1996 |
|---|---|---|
| JP | 09-123764 | 11/1998 |

OTHER PUBLICATIONS

Sridhar, "Reverse foreign key techniques in website development", U.S. Patent Application Publication, Jan.–2002, pp. 1–31.*

Tanigawa Hirohiko, "Device and Method for Data Sharing Between Different Data Base Systems," Patent Abstracts of Japan 08–016439, Jan. 1, 1996, p. 1.

Kagei Koji, "Dynamic Access Method for Database," Patent Abstracts of Japan 10–312331, Nov. 24, 1998, p. 1.

* cited by examiner

Primary Examiner—Thuy N. Pardo
(74) Attorney, Agent, or Firm—Townsend and Townsend and Crew LLP

(57) ABSTRACT

The present invention provides techniques for answering a user's query to a database system. An embodiment provides a database querying method in which a first data item is obtained from a Data Base Management System (DBMS) database table in response to a query request. A second data item is obtained by referencing a DBMS updated log file, having log data associated with the first data item, for example a timestamp. The first and second data items are then integrated and returned as an integration result to the query request. In one embodiment the first and second data items are integrated in a virtual table in accordance with a predetermined business rule.

28 Claims, 9 Drawing Sheets

| Virtual table ID (411) | Virtual table name (412) | Virtual table item name (413) | Item rule (414) | Updated log file setup ID (415) |
|---|---|---|---|---|
| 1 | KVIEW1 | Customer name | DBMS1. Product X transaction information or customer DBMS2. name for product Y transaction information | |
| 2 | KVIEW1 | X transaction price | DBMS1. Price in product X transaction information | |
| 3 | KVIEW1 | Updated timestamp 1 | | 1 |
| 4 | KVIEW1 | Y transaction price | DBMS2. Price in product Y transaction information | |
| 5 | KVIEW1 | Updated timestamp 2 | | 2 |
| 6 | KVIEW1 | Total | DBMS1. Product X transaction DBMS2. price and total of prices in product Y transaction information | |

Virtual table definition information 112

FIG.5

| DBMS setup ID (511) | DBMS name (512) | Host name (513) | Log-In user name (514) | Password (515) |
|---|---|---|---|---|
| 1 | DBMS1 | host1 | user1 | aaaa |
| 2 | DBMS2 | host2 | user2 | bbbb |

DBMS setup information 113

METHOD AND SYSTEM FOR QUERYING DATABASE, AS WELL AS A RECORDING MEDIUM FOR STORING A DATABASE QUERYING PROGRAM

CROSS-REFERENCES TO RELATED APPLICATIONS

This application is related to and claims priority from Japanese Patent Application No. 2000-180702, filed on Jun. 12, 2000.

BACKGROUND OF THE INVENTION

The present invention relates generally to accessing information in a database or databases and more particularly to techniques for providing answers to user queries using a database system.

Generally, no data updated timestamp is included as a data item of any table in a relational database. However, there is a technique that uses a timestamp of data registration/updating (hereinafter, to be referred to as data freshness) for each data item in case a plurality of data tables existing in a database or different databases are integrated into one table in a database system.

The technique is disclosed, for example, in JP-A-No. 10-312331, "Dynamic Access Method for Database," by Kagei Koji, filed May 14, 1997, assigned to Hitachi, Ltd. When a data item is updated in one of several databases the database server of the effected database notifies a data freshness manager of the updated data name and the updating time immediately. The data freshness manager then updates the last update time of the corresponding data item in a data freshness table. Thus the data freshness manager maintains an internal table with the latest update time for the data item in each database in which the data item is stored. When a user queries for the data item, the data freshness manager uses the update time to select updated data item with the most recent time, from the one or more databases the item is stored in, to be returned to the user, i.e., the user gets the "freshest" data. The timestamps on the data item in the data freshness table are for internal use by the data freshness manager and are not accessible to the user. In business situations it is typically important to know when the data was last created/updated. For example, an accounting of the bills paid in the last month may be required. Thus there is a problem with the above data freshness technique hiding the timestamp from the user.

In addition, the data information used in actual business work does not always need the precise updated timestamp of data. The updated timestamp is decided by an application program that uses the subject database. For example, sales data in a business program may be totaled on the 20th of every month. Hence the exact date of the sale does not need to be displayed to the user, but may be "rounded-up" to the 20th. For example, sales on the 18th are included in the sales for the 20th. Or for example, the user may want to include data updated early in the morning of the 21st in the data of 20th sometimes. The above-described technique, however, does not have the flexibility for enabling such processing.

Furthermore, there may be times, when either a data freshness manager is not needed or has not been installed yet. Thus a timestamp, albeit an internal timestamp, may not be available. A data freshness manager may not be needed when the data item is unique to the databases. Thus the data item retrieved is normally the item stored in the unique location and there in no need for the overhead communication traffic of maintaining a separate freshness update table. Of course before the data freshness manager is installed, there is no freshness data table.

Thus there is a need for the user to have access to the timestamp of updated data and to be able to have such updated data processed to be used conveniently according to a company's business rules.

SUMMARY OF THE INVENTION

The present invention provides techniques for answering a user's query to a database system, including giving information associated with the data in the database tables, for example, a timestamp in a log file.

An exemplary embodiment provides a database querying method in which a first data item is obtained from a Data Base Management System (DBMS) database table in response to a query request. A second data item is obtained by referencing a DBMS updated log file, having log data associated with the first data item, for example a timestamp. The first and second data items are then integrated and returned as an integration result to the query request. In one embodiment the first and second data items are integrated in a virtual table in accordance with a predetermined business rule.

In another embodiment of the present invention a database querying system is provided. The system includes a database access module for obtaining a first data item from a database table of a database system in response to a query request; a log extractor module for obtaining a second data item based on a value related to the first data item, where the value is in an updated log file of the database system; and an integrator module for integrating the first and second data items into an integration result, the integration result related to a response to the query request. The database querying system may further include a translator module coupled with the log extractor module and the said integrator module for modifying the second data item from the log extractor module according to a predetermined translation rule, before the second data item is used by the integrator module.

In yet another embodiment of the present invention a database integrator is configured by a system timestamp extractor/translator, a record set generator, and a database access controller. The system timestamp extractor/translator obtains an updated log file from its corresponding database in each DBMS (Data-base Management System) of one or more DBMSs via the database access controller and modifies the obtained updated log file according to predetermined values in the timestamp translation rule information. Since the DBMS updated log file has the latest update time of a data item (as well as past update times), there is no need for another communication from the database system, when the data item is updated.

In an embodiment of the present invention to obtain timestamp information, the system timestamp extractor/translator translates the subject date, for example, a updated timestamp in the U.S. Calendar to that in the Japanese Calendar and/or an updated timestamp to a specific base day such as the 20th according to the predetermined value(s) in the timestamp extraction/translation control information; The timestamp data adding processor provided in the record set generator adds this timestamp information obtained by the system timestamp extractor/translator to requested record sets obtained from of the one or more DBMSs, and returns the integration result to the query generator.

DESCRIPTION OF THE SPECIFIC EMBODIMENTS

The integrated database system in one embodiment of the present invention is a system that integrates tables stored in one or a plurality of databases so as to define one table (virtual table) When the user issues a query request to the database system so as to access the virtual table with use of a SQL, etc., the integrated database system, receiving the query request, divides the query request into a plurality of query requests so as to be issued to a plurality of DBMSs. A record set is returned from each of these DBMSs and the record sets are integrated into one record set. And the integration result is returned to the request origin. This embodiment of the present invention is especially characterized in that a data updated timestamp is provided as one of the items in the virtual table. Although real data in other items are stored in a memory of the database, such a data updated timestamp is not stored actually in the memory; it is queried in and obtained from log information each time the request is issued from an application program. In an another embodiment the virtual table includes other information, which is obtained by querying the log information. As described above this other information is not stored in any table, but taken from the updated log file on an as-needed basis.

An alternative embodiment of the present invention provides a view or a view table. A view or view table is formed by selecting proper items from a plurality of real tables so as to define a schema and enable the user to recognize the schema as one virtual table. Because there is no physical table concerning the schema itself in the memory, the integrated database system, when receiving a query request, translates the request to a query request to each real table and returns the requested record set to the request origin as a response. This embodiment has a virtual table whose schema is defined for not only the items in real tables, but also the items existing in the log information.

Hereunder, the preferred embodiments of the present invention will be described with reference to the accompanying drawings.

Figure 1:
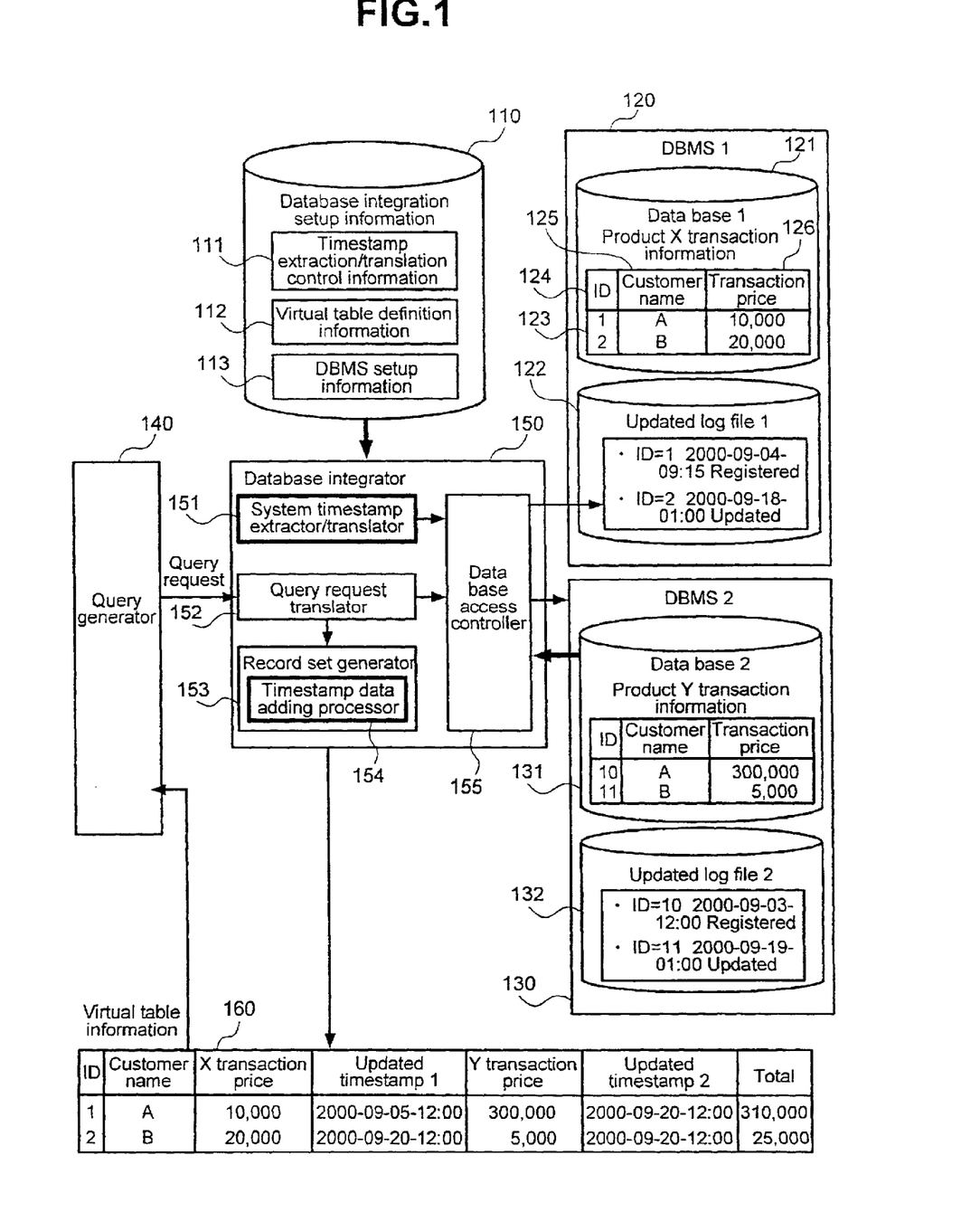
FIG. 1 is a block diagram of a database querying system of an embodiment of the present invention.

FIG. 1 shows a block diagram of a database querying process to be performed according to an embodiment of the present invention. In this processing, a virtual table is defined from a plurality of DBMSs. Database integration setup information 110 stores setup information referenced in a processing performed by a database integrator 150. The database integration setup information 110 stores timestamp extraction/translation control information 111, virtual table definition information 112, and DBMS setup information 113. The timestamp extraction/translation control information 111 stores information for obtaining timestamp information from the updated log file of a DBMS to be integrated, thereby translating the timestamp information to the time stamp format desired by the system user.

Figure 3:
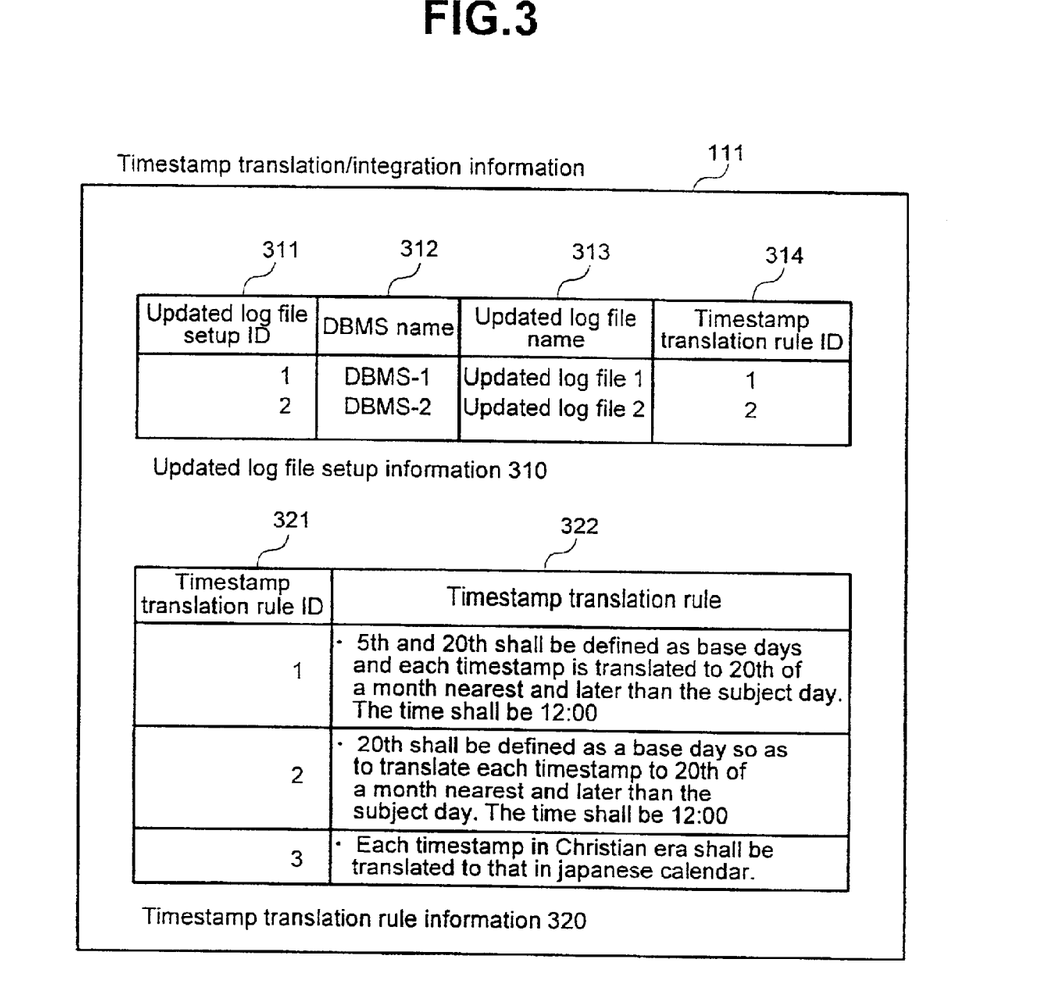
FIG. 3 is a configuration of timestamp extraction/translation control information of an embodiment of the present invention.

Next, the timestamp extraction/translation control information 111 will be described with reference to FIG. 3. As shown in FIG. 3, the timestamp extraction/translation control information 111 consists of updated log file setup information 310 and timestamp translation rule information 320. The updated log file setup information 310 consists of an updated log file setup ID 311, a DBMS name 312, an updated log file name 313, and a timestamp translation rule ID 314. The updated log file setup ID 311 stores an identifier for identifying record information. The DBMS name 312 stores a DBMS name for identifying a database system. In FIG. 3, the DBMS name 312 stores the DBMS1 or DBMS2 value. Those are used to distinguish DBMS1 120 from DBMS2 130. The updated log file name 313 stores a file name including a path for identifying a position of an updated log file disposed in a subject machine. The timestamp translation rule ID 314 stores an identifier of timestamp translation rule information 320 to be described later. The timestamp translation rule information 320 consists of a timestamp translation rule ID 321 and a timestamp translation rule 322. The timestamp translation rule ID 321 stores an identifier for identifying record information uniquely. The timestamp translation rule 322 stores a rule for translating timestamp information obtained from an updated log file to timestamp information in a format desired by the system user. The rule to be stored here is, for example, a rule for translating an updated timestamp to a specific base day (for example, both 5th and 20th of every month are set as base days so that an updated timestamp, which may be 4th actually, is translated to the 5th and an updated timestamp, which may be the 15th, is translated to the 20th), a rule for translating a timestamp in the U.S. Calendar to a timestamp in the Japanese Calendar, or the like. Those rules will be described later with reference to FIG. 9.

The virtual table definition information 112 stores definition information of a virtual table configured on the basis of DBMS items to be integrated. A virtual table mentioned here is similar to a view in a normal DBMS. A view in a DBMS has no real table, but it can define relationships among items in a plurality of tables. The view enables data to be queried just like normal tables. A virtual table in this embodiment therefore is an expanded concept of such a view. A virtual table defines relationship among items in a DBMS table and correspondence of a table item to others in a DBMS. A virtual table in this embodiment can thus define a schema as a kind of view for DBMS tables.

Figure 4:
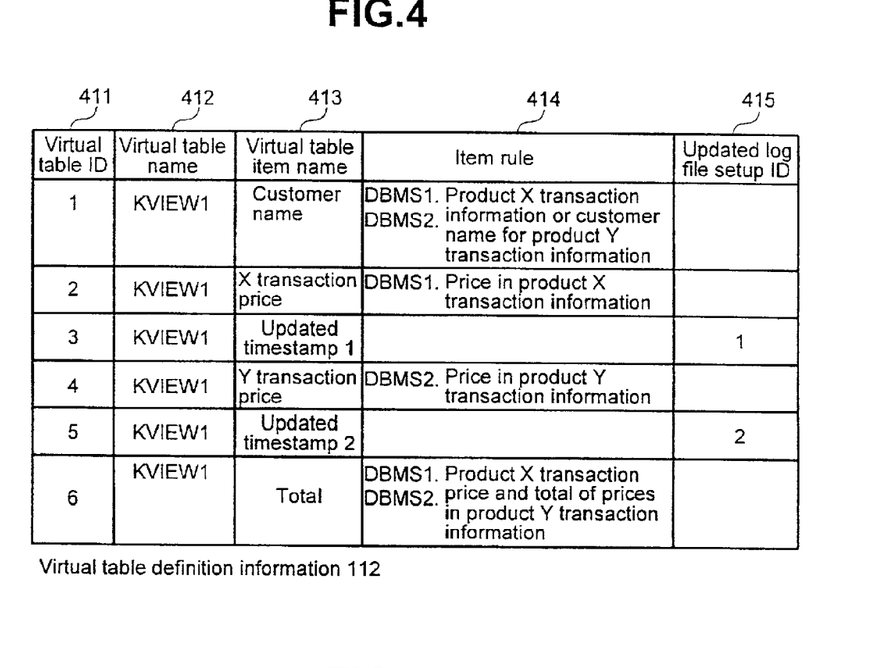
FIG. 4 is a configuration of a virtual table definition information of an embodiment of the present invention.

Next, virtual table definition information 112 will be described with reference to FIG. 4. The virtual table definition information 112 shown in FIG. 4 consists of a virtual table ID 411, a virtual table name 412, a virtual table item name 413, an item mapping rule 414, and an updated log file setup ID 415. The virtual table ID 411 stores an identifier for identifying record information uniquely. The virtual table name 412 stores a virtual table name. The virtual table item name 413 stores an item name in a subject virtual table. The item mapping rule 414 stores a rule for corresponding a table in a DBMS to an item. The updated log file setup ID 415 stores an updated log file setup ID 311 of updated log file setup information 310. In case the updated log file setup ID 415 is used, it is possible to define a timestamp information item that does not exist in any DBMS table as an item in a virtual table. The item mapping rule 414 and the updated log file setup ID 415 are mutually exclusive; There can be entry for each row in either 414 or 415, but not both.

The configuration of the virtual table definition information 112 is just an example. A virtual table may also be defined with use of a script language, etc. For example, to define a view in a DBMS, SQL may be used to define a virtual table.

Figure 5:
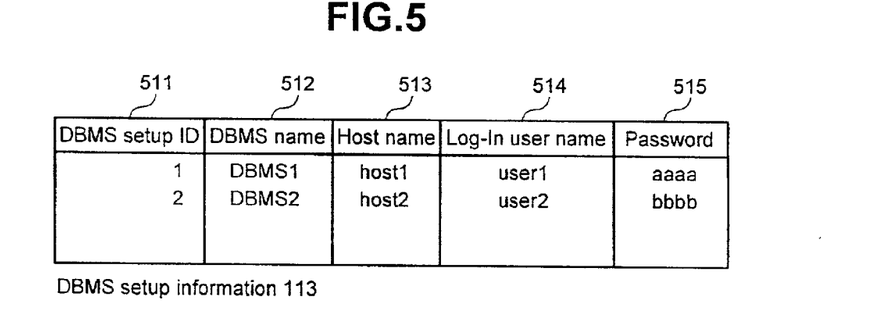
FIG. 5 is a configuration of DBMS setup information of an embodiment of the present invention.

The DBMS setup information 113 stores setup information of a DBMS to be integrated. Hereinafter, the DBMS setup information 113 will be described with reference to FIG. 5. The DBMS setup information 113 consists of a DBMS setup ID 511, a DBMS name 512, a host name 513, a log-in user name 514, and a password 515. The DBMS setup ID 511 stores an identifier for identifying record information uniquely. The DBMS name 512 stores a name for identifying a DBMS to be integrated. In this embodiment, the DBMS name 512 stores either DBMS1 or DBMS2. The host name 513 stores a host name for identifying a computer in which each DBMS operates. The log-in user name 514 and the password 515 store a user name and a password used for a log-in processing when data is queried in each DBMS.

Both DBMS1 120 and DBMS2 130 are to be integrated. In FIG. 1, only two DBMSs are illustrated, but any number of DBMSs can be integrated in the database integrator 150 of the present invention.

The DBMS1 120 has a database 1 121 and an updated log file 1 122. The database 1 121 stores table information to be integrated. In FIG. 1, the database 1 121 stores product X transaction information 123. The product X transaction information 123 includes an ID 124, a customer name 125, and a transaction price 126. The transaction price 126 stores a product X transaction price for each customer. The updated log file 122 stores updating log information for the DBMS1 121. The updated log file stores such log information as a table name, a record ID, an updated timestamp, etc., which can be derived. In this example, a record ID and an updated timestamp are stored. Updating described in this embodiment is assumed to include new registration, modification, or deletion of information.

An updated log file can be generated in two ways; (1) generated automatically by the DBMS basic function and (2) generated with use of a table modification monitoring program separately from the subject DBMS.

A DBMS, like the way of (1), is often provided with a basic function for generating an updated log file automatically when the DBMS is updated. In such a case, the DBMS function can be used to generate an updated log file.

On the other hand, even when the DBMS is not provided with the basic function for generating an updated log file automatically, a processing can be added so as to periodically monitor the subject database separately from the subject DBMS so as to output the difference from the original information as a file (way (2) above). An updated log file can thus be generated without use of the DBMS basic function.

Because this embodiment enables any means to be used for generating an updated log file, the present invention can apply to updated log files generated in any of the methods (1) and (2) described above. The DBMS2 130 can be configured just like DBMS1 120.

Next, each processor shown in FIG. 1 will be described.

The query generator 140 issues a query request to the database integrator 150. A structured query language (SQL), which is a standard language for operating a database, is used to query a virtual table in response to such a query request. In this embodiment, the SQL used for querying normal tables is expanded so as to cope with virtual tables Query requests may also be processed with a method other than the SQL,. For example, Oracle OLE has object oriented API's to access the database (see www.orafaq.com/faqoo-4o.htm).

The database integrator 150 queries data in the DBMS1 120 and the DBMS2 130 according to a query request from the query generator 140 and integrates requested record sets. The database integrator 150 includes a system timestamp extractor/translator 151, a query translator 152, a record set generator 153, a timestamp data adding processor 154, and a database access controller 155.

The system timestamp extractor/translator 151 references to the timestamp extraction/translation control information 111 so as to extract and translate timestamp information stored in the subject updated log file.

The query translator 152 translates a query request from the query generator 140 to a plurality of query requests to be transferred to a plurality of DBMS tables by referencing the virtual table definition information 112.

The record set generator 153 integrates queried data obtained from a plurality of DBMSs so as to generate an integration result in accordance with the query request. The record set generator 153 includes a timestamp data adding processor 154. The timestamp data adding processor 154 adds timestamp information that does not exist in the subject original DBMS table to a requested record set when generating a requested record set. The timestamp information obtained from the system timestamp extractor/translator 151 is used as timestamp information in this case.

The database access controller 155 controls processing carried out for databases, as well as acquisition of updated log files.

Figure 2:
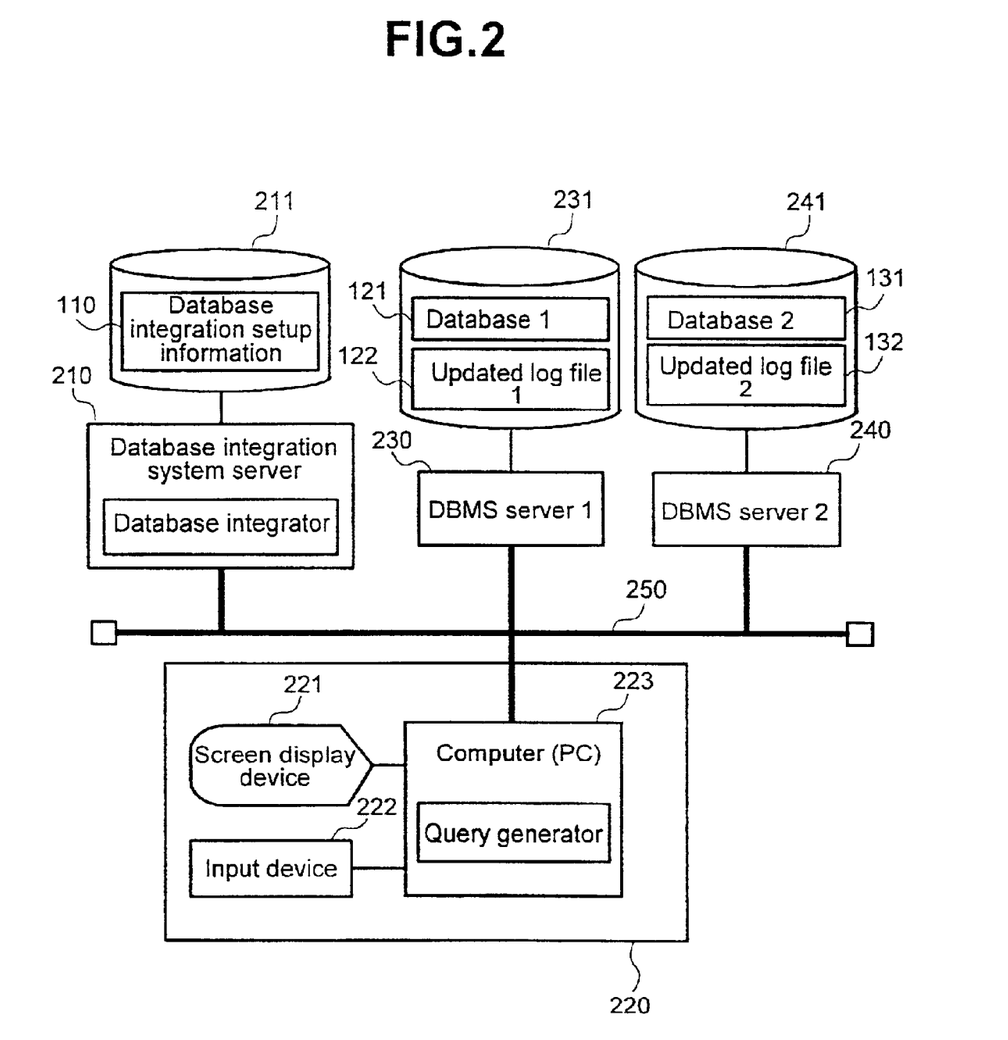
FIG. 2 is a block diagram of a database querying system of another embodiment of the present invention.

FIG. 2 shows a block diagram of an integrated database system of an alternative embodiment of the present invention. The system in this embodiment comprises an integrated database system server 210, a query request terminal 220, a DBMS server 1 230, a DBMS server 2 240, storage 211, 231, and 241. The integrated database system server 210, the computer 223, the DBMS server 1 230, and the DBMS server 2 240 are computers. Each of those computers includes a CPU, a memory, and a storage just like an ordinary computer. A database integrator 150 is disposed in the integrated database system server 210. A database integration setup information 110 is disposed in the storage 211 of the integrated database system server 210. The query request terminal 220 is configured by a screen display device 221, an input device 222, and a computer 223. The input device 222 is not limited only to a keyboard, a mouse, etc.; it may be a voice input device. A query generator 140 is disposed in the computer 223. Both of the database 1 121 and the updated log file 1 122 are stored in the storage 231 of the DBMS server 1 230. Both of the database 2 131 and the updated log file 2 132 are stored in the storage 241 of the DBMS server 2 240.

In this embodiment, although four computers are used as shown in FIG. 2, another embodiment uses only one computer. In case processing executed by a plurality of computers are integrated, those computers may be reduced to two or three computers. Although only two DBMSs are to be integrated in FIG. 2, the number of DBMSs may be increased to 3, 4 or more. The database integrator in this embodiment is realized by a program and the program may be stored on a computer readable recording medium.

In the following embodiment, only timestamp information is obtained from an updated log file so as to be added to a requested record set as an item, the processing of the present invention is not limited only to such data; any information included in an updated log file can be subjected to the processing.

Figure 6:
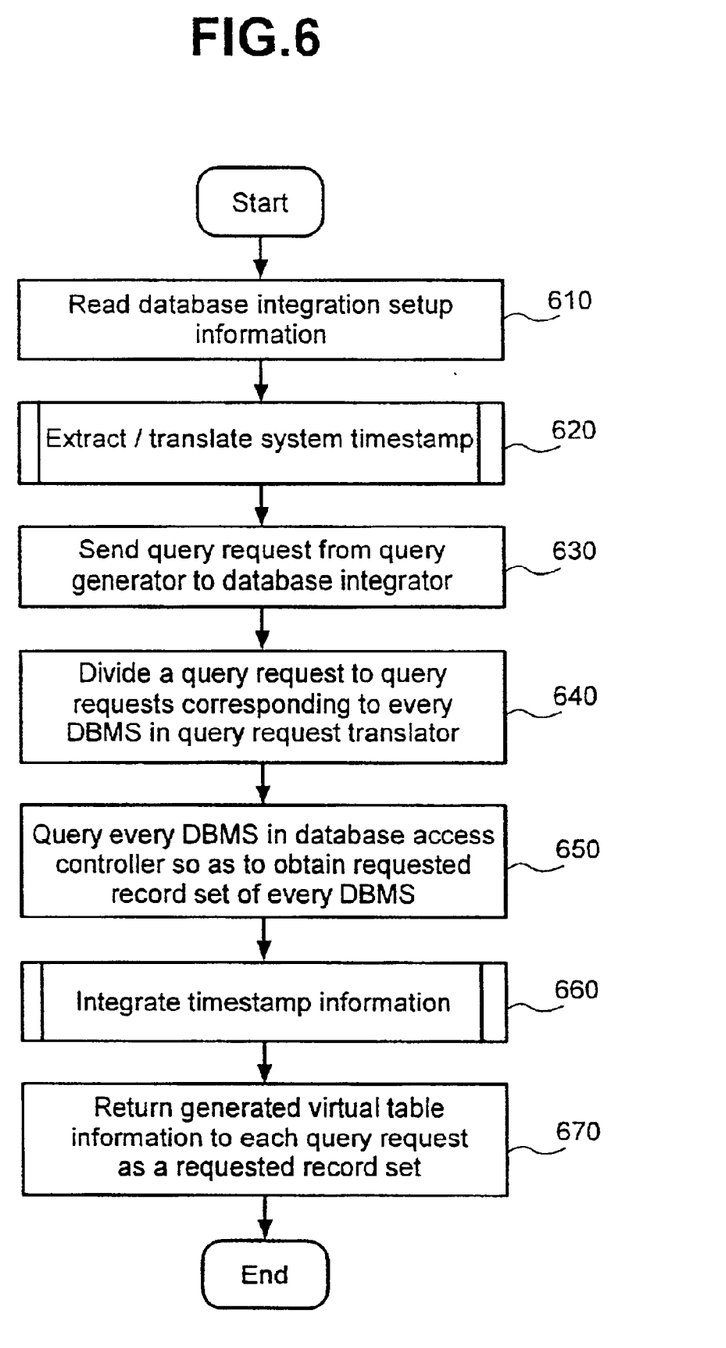
FIG. 6 is a flowchart of a database querying method of an embodiment of the present invention.

Next, such a processing in this embodiment will be described with reference to FIG. 6.

In step 610, the database integrator 150 reads the database integration setup information 110 and stores it in the integrated database system server 210. Unless otherwise specified, it is premised hereinafter that data is to be read into the integrated database system server 210.

Figure 9:
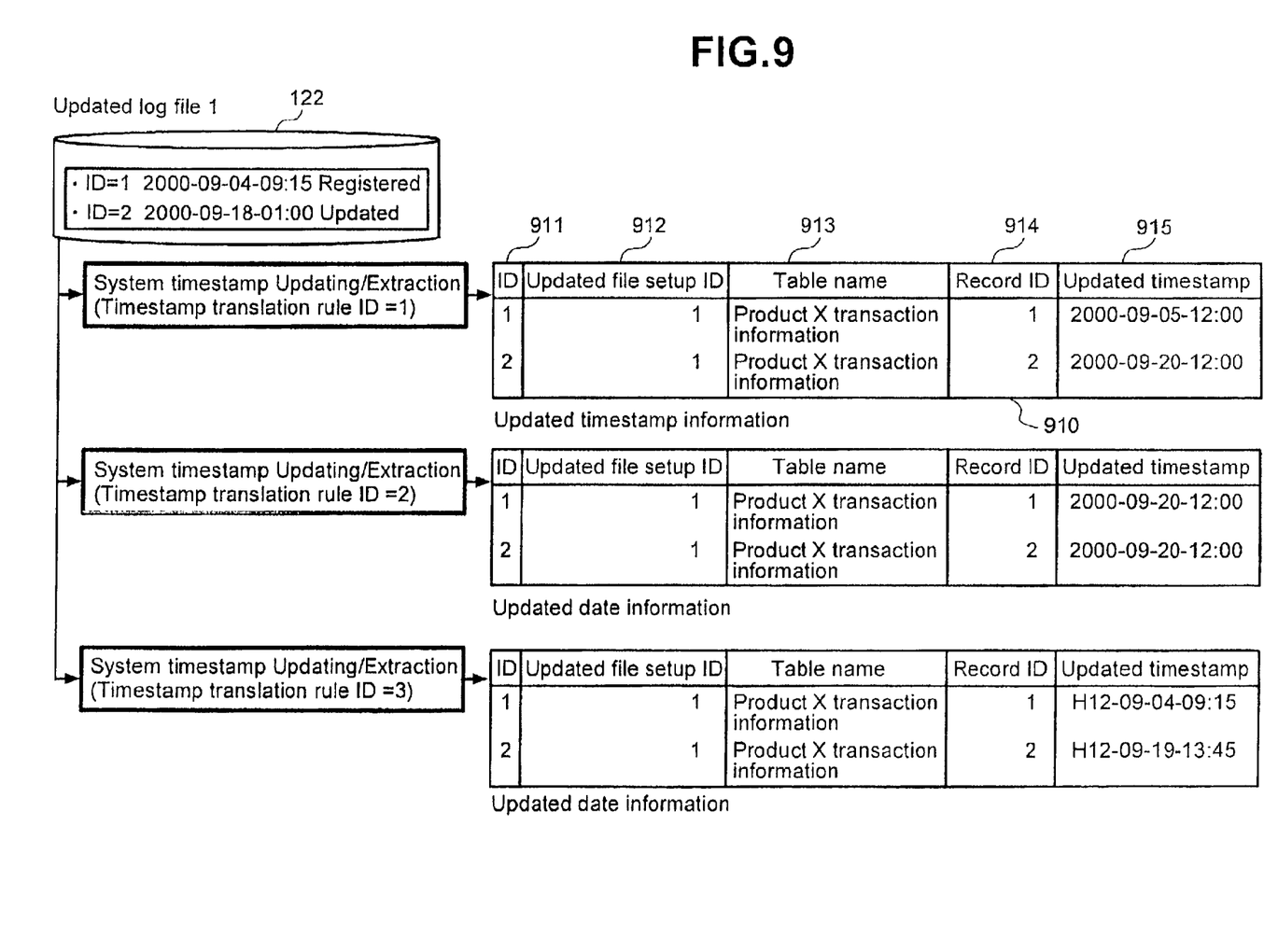
FIG. 9 is an example of a timestamp translation rule.

In step 620, a system timestamp is extracted and translated according to the information read in step 610. Consequently, the timestamp extracted from an updated log file and information for identifying both table and record to be updated in accordance with the extracted timestamp are held in a memory. The timestamp information held in the memory at this time is assumed to be already translated from the U.S. calendar to the Japanese Calendar. FIG. 9 shows an example of such a timestamp translated and held in a memory. The translated timestamp information and the processing in this step will be described later with reference to FIG. 7.

In step 630, the query generator 140 issues a query request to the database integrator 150 so as to query data in a virtual table. For example, the following SQL for the virtual table is used for the query request.

SELECT * FROM KVIEW1;

In step 640, the query translator 152 translates the above query request to requests to be issued to each respective DBMSs. For example, the SQL used in step 630 is translated to two SQLs as shown below.

SQL TO DBMS1: SELECT * FROM PRODUCT X TRANSACTION INFORMATION;

SQL TO DBMS2: SELECT * FROM PRODUCT Y TRANSACTION INFORMATION:

Such a method for translating an SQL to SQLs so as to be issued to respective DBMSs is already disclosed in for example, Japanese Application No. 06-145929, "Apparatus and Method for Sharing Data among Different Database Systems," by T. Hirohiko, filed Jun. 28, 1994. In step 650, the database access controller 155 issues a query request to each respective DBMSs so as to obtain the requested record sets from them. In this embodiment, the database access controller 155 obtains a requested record set of the execution of "SELECT * FROM PRODUCT X TRANSACTION INFORMATION;" from DBMS1. Note that, however, a processing must be done in this case so as to connect a database for each DBMS before issuing a query request to the DBMS. The host name 513, the log-in user name 514, and the password 515 prepared in the DBMS setup information 113 are used for such a database connection processing.

In step 660, timestamp information items are integrated according to the updated timestamp information held in step 620 and the requested record sets obtained in step 650. The processing in this step will be described later in detail with reference to FIG. 8.

In step 670, the integration result generated in step 660 is returned to the query processor 140.

Figure 7:
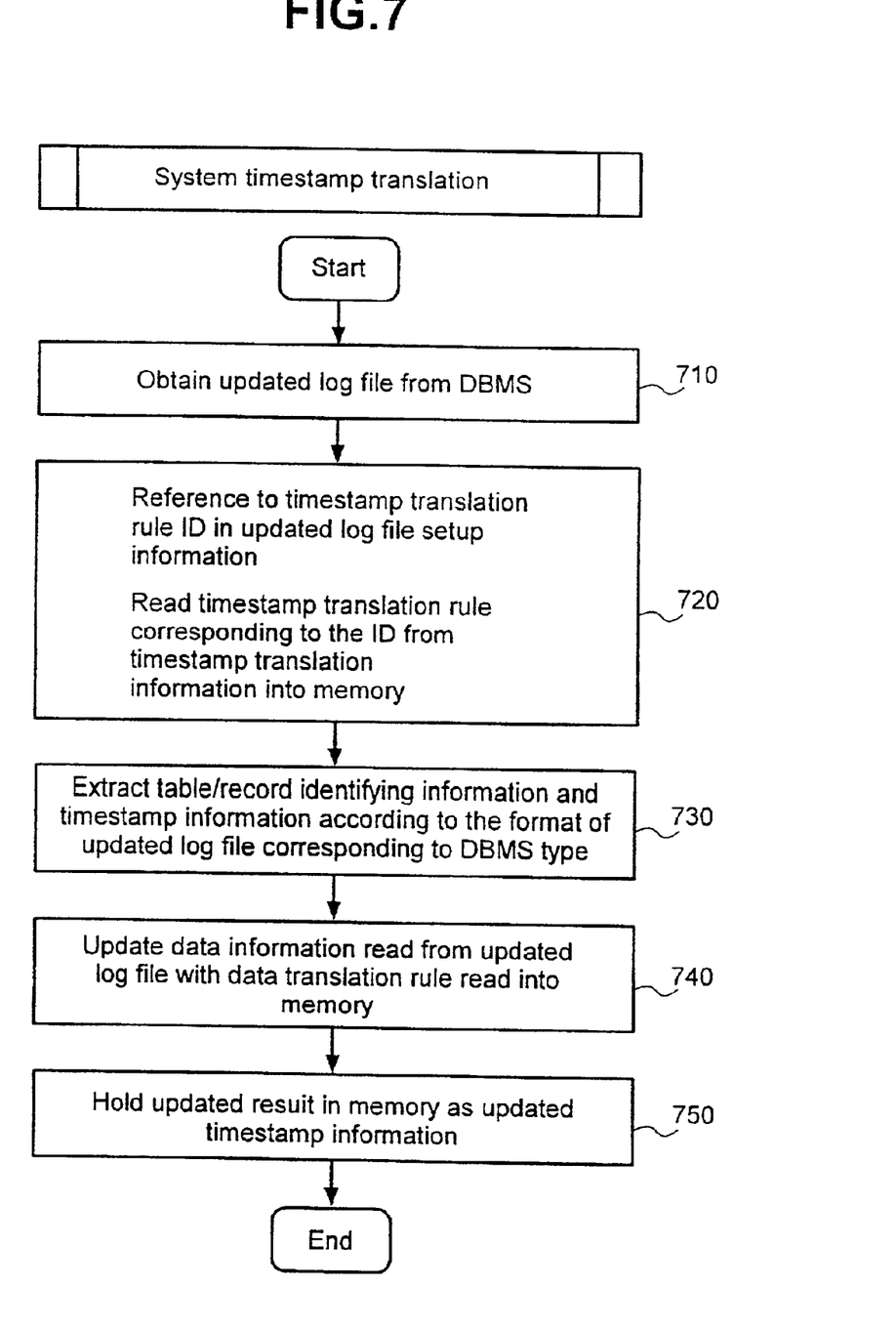
FIG. 7 is a flowchart of a system timestamp translation/extraction method of an embodiment of the present invention.

Next, the processing in step 620 shown in step 6 will be described with reference to FIG. 7.

In step 710, the database integrator 150 references the DBMS name 312 and the updated log file name 313 prepared in the updated log file setup information 310 and requests that the database access controller 155 obtain the subject updated log file. The database integrator 150 thus obtains the subject updated log file. The database access controller 155 then references the DBMS setup information 113 so as to access each DBMS. When obtaining an updated log file, such a file transfer command as ftp, etc. may be used without connecting to any database. In this embodiment, the database access controller 155 also executes control of the file transfer.

In step 720, the database integrator 150 references the timestamp translation rule ID 314 prepared in the updated log file setup information 310 and reads the timestamp translation rule 322 corresponding to the timestamp translation rule ID 314 from the timestamp translation rule information 320 and stores it in a memory.

In step 730, the database integrator 150 extracts updated data timestamp information from the subject updated log file. Because an updated log file has a format decided for each DBMS, the database integrator 150 reads a file according to the decided format so as to extract updated timestamp information.

In step 740, the database integrator 150 translates the updated timestamp obtained in step 730 according to the timestamp translation rule read in step 720.

Hereunder, the timestamp translation rule will be described in reference to FIG. 9. Whether to request timestamp translation depends on an application program that uses the subject database. For example, an application program that totals sales results takes statistics of sales between base days (5th and 20th of every month). In this case, it is important on which base day sales are totaled; it does not matter on which day between base days a sale occurs. This is why it is necessary for such an application program that an actual sales timestamp is translated to a base day on which sales should be added up. In the example shown in FIG. 9, the updated log file 1 122 stores such updated timestamp information as "2000-09-04-09:15". FIG. 9 shows how this timestamp information is translated according to a timestamp translation rule. The timestamp translation rule used in FIG. 9 is the same as that shown in FIG. 3.

According to the timestamp translation rule ID=1 of 911 shown in FIG. 9, "2000-09-04-09:15" is translated to a base day 5th. The time is translated to "12:00". Thus "2000-09-04-09:15" is translated to the updated timestamp 915 of "2000-09-05-12:00." According to the timestamp translation rule ID=2, "2000-09-04-09:15" is translated to a base day 20th. The time is translated to "12:00". According to the timestamp translation rule ID=3, "2000-09-04-09:15" is translated from the U.S. calendar to the Japanese Calendar. The timestamp translation shown in FIG. 9 is done in step 740. The translation rule can be varied for each column in timestamp information. The updated timestamp 1 column in the virtual information 160 shown in FIG. 1 corresponds to the translation rule, in which 5th and 20th are defined as base days. The updated timestamp 2 column corresponds to the translation rule, in which 20th is defined as a base day. FIG. 1 shows an example of translated virtual table information 160. FIGS. 3 and 4 show the setup information used in this.

In step 750, the translation result obtained in step 740 is held in a memory and includes the translated timestamp information 910 shown in FIG. 9. The translated timestamp information 910 consists of an ID 911, an updated log file setup ID 912, a table name 913, a record ID 914, and a translated timestamp 915. The ID 911 stores an identifier for identifying record information. The updated log file setup ID 912 stores an updated log file setup ID 311. The table name 913 and the record name 914 store a table name and a record ID obtained by reading the subject updated log file respectively. The translated timestamp 915 stores a timestamp translated by the processing in step 740. The processing is executed respectively so as to translate a system date.

Figure 8:
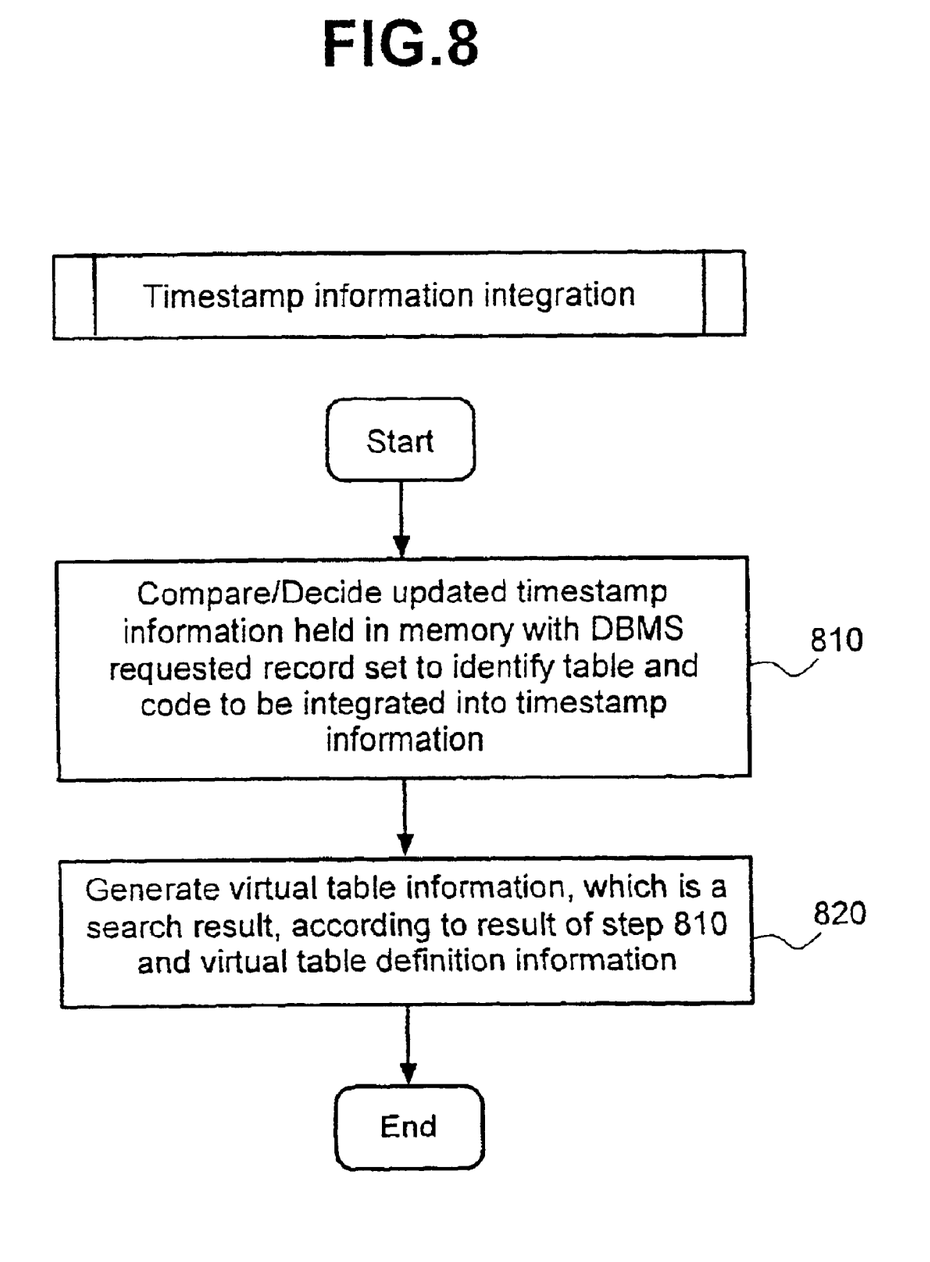
FIG. 8 is a flowchart of a timestamp information integrating method of an embodiment of the present invention.

Next, the processing in step 660 shown in FIG. 6 will be described with reference to FIG. 8.

In step 810, the result of querying in each DBMS is compared with the translated timestamp information 910 held in the memory so as to identify the translated timestamp 915 to be added as a requested record set. More specifically, the table name and the record ID obtained by querying each DBMS are compared with the table name 913 and the record ID 914 prepared in the translated timestamp information 910 so as to identify the translated timestamp 915 to be added. In step 820, the translated timestamp 915 identified in step 810 is added as an item in the subject virtual table. By referencing to the updated log file setup ID 415 in the Virtual table definition information 112, the database integrator 150 decides an item in the subject virtual table, to which the translated timestamp 915 is to be added. The database integrator 150 then adds the translated timestamp 915 as an item to the virtual table. For example, ID 2 in 911 has updated log file setup ID 1 in 912 and updated timestamp "2000-09-20-12:00." In FIG. 4 415 updated log file setup ID 1 corresponds to Updated timestamp 1 in column 413. In virtual table 160, "2000-09-20-12:00" is shown in the Updated timestamp 1 column.

In this embodiment, the updated log file provided in the subject DBMS is analyzed so as obtain and add the obtained timestamp information when integrating requested record sets obtained in querying in a plurality of DBMSs. Thus an integration result including timestamp information may be returned. Consequently, the querier can know a data updated timestamp by referencing to a virtual table that includes a data freshness item, thereby knowing whether or not desired data freshness requested record set has been obtained even when there is no timestamp item denoting data freshness in the existing DBMSs' tables.

Furthermore, in this embodiment, an updated timestamp on which the actual data updating processing is done is not used as a timestamp for denoting data freshness as is; the updated timestamp is translated to a format according to the user's business translation rule so as to make it easier for the user to reference the updated timestamp. Consequently, the user can reference the updated timestamp information in a format that makes it easier for the user to understand in the user's business environment.

Furthermore, in this embodiment, it is possible to translate an updated timestamp in the U.S. Calendar to that in the Japanese Calendar according to the corresponding translation rule. Consequently, the user can reference the updated timestamp information more easily in the country he/she is doing business in (or with).

Figure 10:
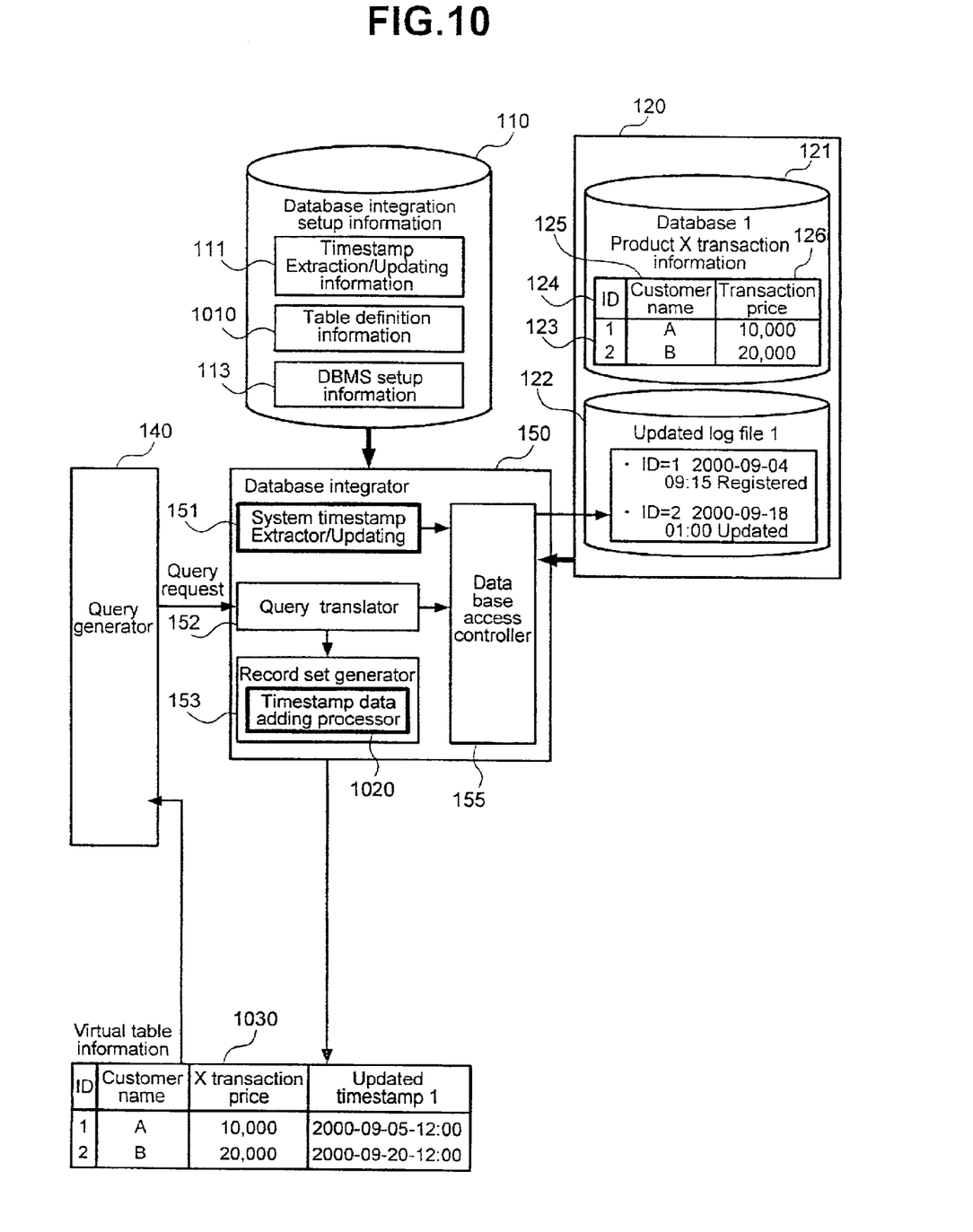
FIG. 10 is a block diagram of an embodiment of the present invention in which a single DBMS is used.

In case the above embodiment is modified as described below, it is also possible to add timestamp information to a table used in a normal DBMS. FIG. 10 shows a schematic block diagram of a database querying system when the modification is done. Hereunder, the modification points will be described. It is premised here that only one DBMS is used. The basic configuration is the same as the above-described embodiment.

In this embodiment, the virtual table definition information 112 is replaced with table management information 1010 for managing tables. The configuration of the table management information 1010 is the same as that of the virtual table definition information 112. In this embodiment, however, it is just required to register DBMS1 related information in the database integration setup information 110 in advance. In step 660 shown in FIG. 6, the timestamp data adding processor 1020 integrates timestamp information of tables, not timestamp information of a virtual table. In step 820 shown in FIG. 8, the integrator 1020 integrates timestamp information of tables instead of generating virtual table information. Because there is only one DBMS, this will not mean expansion of a view table consisting of items of a plurality of tables in a plurality of DBMSs. This table 1030 is also a virtual table, however. Even when there is no timestamp information in actual tables, therefore, it is possible to reference to timestamp information as a result of querying in tables. In addition, it is possible to use timestamp information that does not exist in any table as a querying condition. Consequently, virtual table information 1030 can be obtained as a requested record set.

Because data querying is done in both virtual tables and normal tables in this embodiment, a data updated timestamp can be known, thereby it is known whether or not a desired data freshness requested record set has been obtained even when there is no timestamp item for denoting data freshness in the subject DBMS tables.

In one embodiment of the present invention, information obtained by analyzing the updated log file of a DBMS may be added to a DBMS requested record set by integration processing, thereby returning an integration result. Thus an item in a virtual table may have information that does not exist in the DBMS tables, but in the updated log file.

Furthermore, according to an embodiment of the present invention, timestamp information obtained by analyzing the updated log file of the subject DBMS may be added to the DBMS requested record set integrating process, thereby returning an integration result including timestamp information to the query request origin. Consequently, even when there is no timestamp item for denoting data freshness in the existing DBMS tables, it is possible for the querier to know a data updated timestamp, as well as whether or not a desired data freshness requested record set has been obtained by referencing a virtual table including the subject data freshness item.

Although the above functionality has generally been described in terms of specific hardware and software, it would be recognized that the invention has a much broader range of applicability. For example, the software functionality can be further combined or even separated. Similarly, the hardware functionality can be further combined, or even separated. The software functionality can be implemented in terms of hardware or a combination of hardware and software. Similarly, the hardware functionality can be implemented in software or a combination of hardware and software. Any number of different combinations can occur depending upon the application.

Many modifications and variations of the present invention are possible in light of the above teachings. Therefore, it is to be understood that within the scope of the appended claims, the invention may be practiced otherwise than as specifically described.

What is claimed is:

1. A database querying method, comprising:
   obtaining a first data item from a database table of a database system in response to a query request;
   obtaining a second data item from an updated log file of said database system based on a value related to said first data item, said value being stored in said updated log file;
   integrating said first and second data items into an integration result; and
   returning said integration result as a result of said query request,
   wherein said second data item comprises information indicative of an update time of said first data item.

2. The database querying method of claim 1,
   wherein said second data item is obtained by translating said value according to a predetermined translation rule.

3. A database querying system comprising:
   a database access module for obtaining a first data item from a database table of a database system in response to a query request;
   a log extractor module for obtaining a second data item from an updated log file of said database system based on a value related to said first data item, said value being stored in said updated log file; and
   an integrator module for integrating said first and second data items into an integration result, said integration result related to a response to said query request,
   wherein said second data item comprises information indicative of an update time of said first data item.

4. The database querying system of claim 3 further comprising:
   a translator module coupled with said log extractor module and with said integrator module for modifying said second data item from said log extractor module according to a predetermined translation rule, before said second data item is used by said integrator module.

5. A database querying system, comprising:
   a database processor for receiving a query request and returning a requested record set in response to the query request; and
   a database system comprising a database table and an updated log file;
   wherein said database processor is operably disposed to:
   retrieving a first item from said database table responsive to said query request;
   retrieving a second item, comprising information indicative of an update time of said first item, from said updated log file;
   generating said requested record set, comprising said first item and said second item; and
   returning said requested record set to a query request origin.

6. The database querying system according to claim 5,
   wherein the database processor comprises a translator for translating updated log data, according to a predetermined translation rule, into translated log data and substituting said translated log data for said updated log data in said second item.

7. A computer program product for use with a database system, comprising:
   a computer readable medium having program code embodied in said computer readable medium, said program code comprising:
   program code for obtaining a first data item from a database table of said database system in response to a query request;
   program code for obtaining a second data item from an updated log file of said database system based on a value related to said first data item, said value contained in said updated log file;
   program code for integrating said first and second data items into an integration result; and
   program code for returning said integration result to said query request,
   wherein said second data item comprises information indicative of an update time of said first data item.

8. A database question and answer method using one or more databases, each database comprising a database table and an updated log file, said updated log file comprising information associated with said database table, said method comprising:
   receiving a query request from a user, said query request comprising a first data item of said database table;
   using said first data item, obtaining a second data item from said updated log file;
   modifying said second data item to a third data item using a predetermined business rule;
   generating a virtual table comprising said first and third data items; and
   returning to said user an answer based on said virtual table,
   wherein said third data item comprises information indicative of an update time of said first data item.

9. The database question and answer method of claim 8 wherein said virtual table is discarded after said answer is returned to said user.

10. The database question and answer method of claim 8 wherein said predetermined business rule comprises an accounting time period.

11. The database question and answer method of claim 10 wherein the accounting time period is a fixed day in a month.

12. The database question and answer method of claim 8 wherein said predetermined business rule comprises a base time period.

13. The database question and answer method of claim 8 wherein said predetermined business rule comprises a selected national calendar format for the day, month, and year.

14. The database question and answer method of claim 8, wherein said selected national calendar format is selected from a group consisting of a Japanese Calendar or a U.S. Calendar.

15. The database question and answer method of claim 8 wherein said predetermined business rule comprises a table name.

16. The database question and answer method of claim 8 further comprising:
   when said query request is for a plurality of databases, dividing said query request into a plurality of sub-requests, each sub-request directed to a database of said plurality of databases;
   receiving a record set of a plurality of record sets in response to said sub-request; and
   integrating said plurality of record sets into a result for returning to said user.

17. The database question and answer method of claim 8 wherein said second data item comprises a timestamp for said first data item.

18. The database question and answer method of claim 8 wherein said virtual table is a view table.

19. The database question and answer method of claim 8 wherein said request is based on a search of said information in said updated log file.

20. A system for responding to a user query to a data base management systems (DBMS), wherein said DBMS comprises a database table and an updated log file, said system comprising:

a database access controller for retrieving a data item from said database table responsive to said user query;

a translation module coupled with said database access controller for retrieving an attribute related to said data item from said updated log file and for translating said attribute into a modified attribute according to a translation rule; and an integrator module for integrating said data item and said modified attribute into a virtual table and returning to said user query an answer based on said virtual table, wherein said modified attribute comprises information indicative of an update time of said data item.

21. The system of claim 20 wherein said attribute is a timestamp.

22. The system of claim 20 wherein said translation rule comprises a base time period.

23. The system of claim 20 wherein said translation rule comprises a predetermined country's calendar format.

24. A system for responding to a user query to a data base management systems (DBMS), wherein said DBMS comprises a database table and an updated log file, said system comprising:

an access means for retrieving a data item from said database table responsive to said user query;

an extraction means for retrieving an attribute related to said data item from said updated log file;

a translation means for translating said attribute into a modified attribute according to a translation rule; and a virtual table comprising said data item and said modified attribute wherein a response to said user query is based on said virtual table, wherein said modified attribute comprises information indicative of an update time of said data item.

25. A computer readable medium for storing code for querying a database querying, comprising:

code for obtaining a first data item from a database table of a database system in response to a query request;

code for obtaining a second data item from an updated log file of said database system based on a value related to said first data item, said value contained in said updated log file;

code for integrating said first and second data items into an integration result; and code for returning said integration result as a result of said query request, wherein said second data item comprises information indicative of an update time of said first data item.

26. The computer readable medium of claim 25, further comprising code for obtaining said second data item by translating said value according to a predetermined translation rule.

27. A database querying system comprising:

an access means for obtaining a first data item from a database table of a database system in response to a query request;

an extractor means for obtaining a second data item from an updated log file of said database system based on a value related to said first data item, said value contained in said updated log file; and an integrator means for integrating said first and second data items into an integration result, said integration result related to a response to said query request, wherein said second data item comprises information indicative of an update time of said first data item.

28. The database querying system of claim 27 further comprising:

a translator means for modifying said second data item from said log extractor module according to a predetermined translation rule, before said second data item is used by said integrator module.

* * * * *